United States Patent [19]

Masumoto

[11] Patent Number: 4,882,613
[45] Date of Patent: Nov. 21, 1989

[54] METHOD OF AND APPARATUS FOR MOTION VECTOR COMPENSATION IN RECEIVING TELEVISION SIGNAL BASED ON MUSE SYSTEM

[75] Inventor: Takahiko Masumoto, Toyonaka, Japan

[73] Assignee: Sanyo Electric Co., Ltd., Moriguchi, Japan

[21] Appl. No.: 259,812

[22] Filed: Oct. 19, 1988

[30] Foreign Application Priority Data

Oct. 20, 1987 [JP] Japan .................. 62-264147

[51] Int. Cl.$^4$ .............................................. H04N 9/64
[52] U.S. Cl. ...................................... 358/37; 358/40; 358/105; 358/136; 358/138
[58] Field of Search ................. 358/11, 12, 15, 40, 358/105, 133, 135, 136, 138, 140, 141, 37

[56] References Cited

U.S. PATENT DOCUMENTS 4,692,801  9/1987  Ninomiya et al. .................. 358/138
4,731,651  3/1988  Matsumoto et al. .................. 358/12
4,785,348  11/1988  Fonsalas et al. ..................... 358/138

FOREIGN PATENT DOCUMENTS 189893  8/1987  Japan .

OTHER PUBLICATIONS

"New Transmission System of High Definition Television", NIKKEI McGraw-Hill Inc., Mar. 12, 1984, pp. 112–116.

Primary Examiner—John W. Shepperd
Assistant Examiner—Michael D. Parker
Attorney, Agent, or Firm—Armstrong, Nikaido, Marmelstein, Kubovcik & Murray

[57] ABSTRACT

A time compressed color difference signal included in a high definition television signal is roughly compensated for its units of an interval of one-half of a transmission sampling interval in a range obtained by multiplying the amount of a horizontal motion vector by a compression rate. In addition, the time compressed color difference signal roughly compensated for its finely compensated for in a horizontal direction in units of an interval of one-half of the transmission sampling interval or less by a one-dimensional or two-demensional spacial filter. Futhermore, the time compressed color difference signal is compensaed for in a vertical direction by a distance corresponding to the amount of a vertical motion vector. On this occasion, a time compressed color difference signal to be inserted into a position to be interpolated in the present frame is produced using a time compressed color difference signal in a position spaced apart from the position to be interpolated by a distance corresponding to the amount of the vertical motion vector such that the time compressed color difference signal to be inserted becomes the same type of color difference signal as other time compressed color difference signals on a line to which the position to be interpolated belongs.

19 Claims, 12 Drawing Sheets

○ : 4n th FIELD
□ : (4n+1) th FIELD
● : (4n+2) th FIELD
■ : (4n+3) th FIELD

FIG. 9

| AMOUNT OF HORIZONTAL MOTION VECTOR | REGISTER LENGTH OF REGISTER 13 | INTERPOLATING CHARACTERISTIC OF FILTER 15 | SWITCH 168 OF FILTER 16 | SWITCH 178 OF FILTER 17 |
|---|---|---|---|---|
| +7 | +2 | α | S9 | S16 |
| +6 | +2 | β | S8 | S17 |
| +5 | +2 | γ | S7 | S18 |
| +4 | +1 | 0 | S1 | S14 |
| +3 | +1 | α | S2 | S13 |
| +2 | +1 | β | S3 | S12 |
| +1 | +1 | γ | S4 | S11 |
| ±0 | ±0 | 0 | S5 | S15 |
| −1 | ±0 | α | S9 | S16 |
| −2 | ±0 | β | S8 | S17 |
| −3 | ±0 | γ | S7 | S18 |
| −4 | −1 | 0 | S1 | S14 |
| −5 | −1 | α | S2 | S13 |
| −6 | −1 | β | S3 | S12 |
| −7 | −1 | γ | S4 | S11 |
| −8 | −2 | 0 | S5 | S15 |

FIG. 12

| | AMOUNT OF VERTICAL MOTION VECTOR | SWITCH 313 | SWITCH 314 | SWITCH 315 |
|---|---|---|---|---|
| AT RECEIVING CHROMINANCE SIGNAL | +3 | m | m | m |
| | +2 | − | n | − |
| | +1 | n | m | n |
| | ±0 | − | 0 | − |
| | −1 | m | m | m |
| | −2 | − | n | − |
| | −3 | n | m | n |
| | −4 | − | 0 | − |
| AT RECEIVING LUMINANCE SIGNAL | | − | 0 | − |

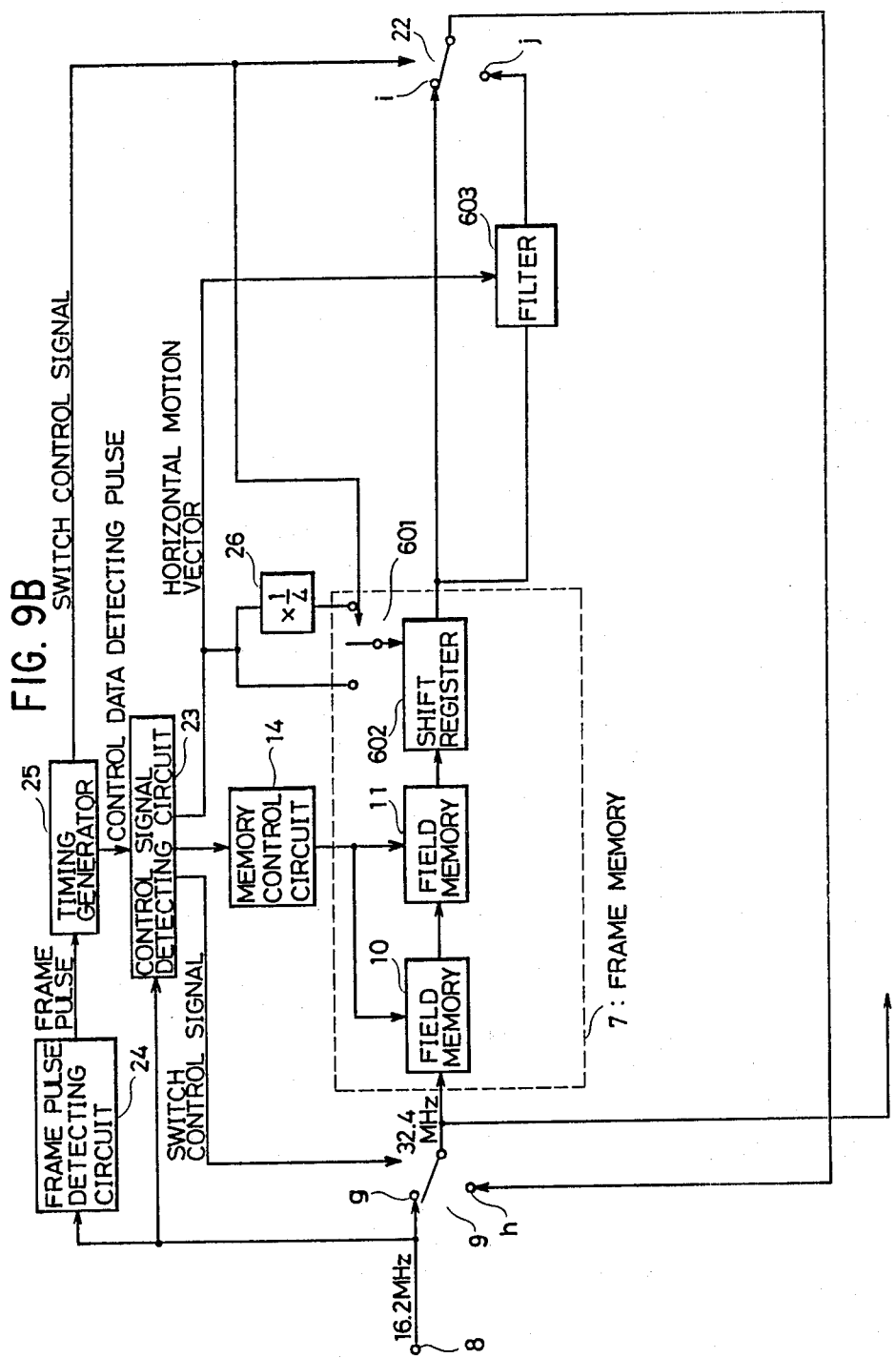

METHOD OF AND APPARATUS FOR MOTION VECTOR COMPENSATION IN RECEIVING TELEVISION SIGNAL BASED ON MUSE SYSTEM

BACKGROUND OF THE INVENTION

1. Field of the Invention

The present invention relates generally to a method of and an apparatus for motion vector compensation, and more particularly, a method and an apparatus for motion vector compensation in receiving a high definition television signal based on a MUSE system.

2. Description of the Prior Art

NHK (Nippon Hoso Kyokai or Japan Broadcasting Corporation) has proposed a bandwidth compressed transmission system for transmitting a high definition television signal (high vision signal) on one channel. This bandwidth compressed transmission system is called MUSE (Multiple Sub-nyquist Sampling Encoding) system.

According to the standard of a high definition television, the number of scanning lines is 1125, a field frequency is 60 Hz, an interlace ratio is 2:1, a length-to-breadth ratio of a picture is 9:16, and a band of a video signal is wide, i.e., about 30 MHz. Therefore, in order to transmit the high definition television signal referred to as (HDTV signal hereinafter) without any modification, a bandwidth of two or more channels of DBS is required. The use of the MUSE system allows the bandwidth of a transmission signal to be compressed to 8 MHz, so that the HDTV signal can be transmitted on one channel of DBS.

FIG. 1 is a diagram showing a sampling pattern based on the MUSE system. In FIG. 1, a mark of a circle ( ○ ), a mark of a square (□), a mark of a solid circle (●) and a mark of a solid square (■) represent a sampling point in the 4n-th field, a sampling point in the (4n+1)-th field, a sampling point in the (4n+2)-th field and a sampling point in the (4n+3)-th field, respectively. $T_0$ denotes a sampling interval, which corresponds to the reciprocal of a transmission sampling rate (16.2 MHz).

As described in, for example, NIKKEI ELECTRONICS issued by NIKKEI McGraw-Hill, Inc., Mar. 12, 1984, pp. 112–116, an article entitled "New Transmission System of High Definition Television", Monthly Report of NHK Science and Technical Research Laboratories, July, 1984, pp. 275–286, Terebi Gijyutu issued by Denshi Gijutsu Shuppan Kabushiki Kaisha, September, 1984, pp. 19–24, and Denpa Kagaku issued by NHK, April, 1984, pp. 103–108; an HDTV signal based on the MUSE system is formed in the following manner.

Sub-nyquist sampling in which a sampling phase is circulated every four fields is carried out for a luminance signal and a chrominance signal of a baseband. The chrominance signal is converted into two color difference signals (R-Y, B-Y), to be time-compressed to ¼. A clock frequency of the luminance signal is 16.2 MHz, and a clock frequency of the color difference signal before time-compression is 4.05 MHz. Thus, a clock frequency of a time compressed color difference signal is 16.2 MHz. More specifically, a transmission sampling pattern of the HDTV signal is set to 16.2 MHz. The time compressed color difference signal is multiplexed in a line sequential manner in the horizontal blanking period of the luminance signal. More specifically, the two time compressed color difference signals R-Y and B-Y are alternately multiplexed every horizontal scanning period. In addition, in the vertical blanking period of the luminance signal, a control signal indicating, for example, data concerning a horizontal motion vector and a vertical motion vector and a sound/additional information signal are multiplexed. In the above described manner, in the HDTV signal based on the MUSE system is formed to be a TCI (Time Compressed Integration) signal based on a 2:1 interlace system. Meanwhile, vertical and horizontal synchronizing signals are multiplexed with same polarity as a video signal in the HDTV signal.

In a receiver for the HDTV signal, a picture is reproduced by combining data at sampling points in four fields. As shown in FIG. 2, the receiver for the HDTV signal comprises a frame memory 1 for interframe interpolation which is operated at a rate (32.4 MHz) of two times the transmission sampling rate. The frame memory 1 comprises a cascade circuit of two field memories 4 and 5 to interpolate a still region and a moving region of an image after interframe interpolation. Each of the field memories 4 and 5 has capacity of two fields, so that the frame memory 1 has capacity of four fields.

Data at a sampling point of an HDTV signal inputted to an input terminal is inputted to the frame memory 1 through a switch 3 which is switched at a clock rate 32 MHz of two times the transmission sampling rate. In addition, data at a sampling point approximately one frame before which is delayed by the frame memory 1 and then outputted is inputted to the frame memory 1 through the switch 3. Consequently, data of a luminance signal and a time compressed color difference signal in the present frame and data of a luminance signal and a time compressed color difference signal one frame before are combined with each other, to be inputted to the frame memory 1. The switch 3 is switched in synchronization with the received HDTV signal, so that the phase of the switching is inverted every frame and every line.

As shown in FIG. 3A, after the switch 3 is first switched to an input side 3a so that data ( ○ mark) at a sampling point in the n-th field is inputted to an input terminal A of the frame memory 1, the switch 3 is switched on an output side 3b of the frame memory 1, so that data (● mark) at a sampling point one frame before which is 10 outputted from the frame memory 1 is inputted to the input terminal A of the frame memory 1. Similarly, data at a sampling point in the (n+1)-th field and data at a sampling point one frame before are alternately inputted to the frame memory 1 (not shown in FIG. 3A). Data thus combined is delayed by one frame (two fields) by the frame memory 1 and then, outputted from an output terminal B, to be combined with data (● mark) at a sampling point in the (n+2)-th field which is inputted to the input terminal 2. Therefore, data at a sampling point in the present frame which is inputted to the input terminal 2 is combined with data at a sampling point one frame before, so that interframe interpolation is carried out.

For example, in a field where data at a sampling point represented by " ○ mark" shown in FIG. 1 is applied to the input terminal 2, the data at the sampling point represented by " ○´ mark " which is applied to the input terminal 2 and data at a sampling point one frame before which is outputted from the field memory 5 are alternately inputted to the field memory 4. Consequently, the data at the sampling point one frame before is inserted into the position of data represented by " mark" shown in FIG. 1. In addition, in a field where the data at the sampling point represented by " ● mark" shown in FIG. 1 is applied to the input terminal 2, the data at the sampling point represented by " ● mark" which is applied to the input terminal 2 and the data at the sampling point one frame before which is outputted from the field memory 5 are alternately inputted to the field memory 4. Consequently, the data at the sampling point one frame before is inserted into the position of the data represented by " ○ mark" shown in FIG. 1. Similarly, in respective fields where data at a sampling point represented by "□ mark" and data at a sampling point represented by " ■ mark" are applied to the input terminal 2, the data at the sampling point represented by "□ mark" and the data at the sampling point represented by " ■ mark" which are applied to the input terminal 2 and data at respective sampling points one frame before which are outputted from the field memory 5 are alternately inputted to the field memory 4, respectively. Consequently, the data at the respective sampling points one frame before are inserted into the positions of the data represented by " ■ mark" and "□ mark" shown in FIG. 1, respectively.

As described in the foregoing, data of two fields obtained by combining data at a sampling point in the present field with data at a sampling point one frame before are written to the field memory 4 every field as data in one field. The data of two fields written to the field memory 4 is delayed by one frame and then, read out from the field memory 5. Consequently, data at a sampling point which is lacking in each field is obtained by interframe interpolation. For example, if the data in the present field is data represented by " ○ mark", data represented by " ● mark" is obtained by interframe interpolation.

The data thus combined is outputted to a circuit in the succeeding stage (not shown) as data of a luminance signal and a line compressed color difference signal in an image of one field.

Meanwhile, when the above described interframe interpolation is carried out for a motion picture portion, there occurs inconvenience such as multi-line blur. Therefore, in a receiver for an HDTV signal, interframe interpolation is generally carried out for only a still picture portion, while interfield interpolation by which a picture is formed using only data at a sampling point in the present field is carried out for a motion picture portion. If this intrafield interpolation is carried out, the quality of a reproduced image is slightly degraded, which does not present a large program because resolution of eyes relative to a fast moving picture is lowered, as compared with that relative to a still picture.

However, for example, the entire picture may be moved in the same direction by slow panning of a camera, to enter a motion picture state . The resolution of eyes is not so lowered relative to such movement. Therefore, when intrafield interpolation is carried out for such a motion picture, blur of an image is noticeable. In this case, if data at a sampling point one frame before which is combined with data at a sampling point in the present field can be shifted, interframe interpolation can be carried out, as for the still picture. On the side of transmission, horizontal and vertical motion vectors indicating the amount of movement of the entire picture are detected, so that data of the horizontal and vertical motion vectors are multiplexed on each field of the HDTV signal. In the receiver, the amount of delay in the frame memory is changed based on motion vectors in each field of the received HDTV signal, so that data at a sampling point one frame before which is outputted from the frame memory is shifted by the amount of movement caused by panning, whereby motion vector compensation is carried out. Consequently, if and when the entire picture is moved in parallel in the same direction, interframe interpolation can be carried out, so that blur of an image can be prevented.

Meanwhile, data of the horizontal motion vector is set to 4 bits in units of a sampling interval $T_0/2$ shown in FIG. 1 such that compensation is carried out in a horizontal direction in the range of $-8$ to $+7$ clocks. In addition, data of the vertical motion vector is set to 3 bits in units of a horizontal scanning period H such that compensation is carried out in a vertical direction in the range of $-4H$ to $+3H$.

The conventional horizontal motion vector compensation described in, for example, Japanese Patent Laying-Open Gazette No. 221090/1984 and the above described monthly report of NHK Science and Technical Research Laboratories is carried out in the following manner. 4-bit data of the horizontal motion vector is inputted to an input terminal 6 shown in FIG. 2. The amount of delay in the field memory 5 is changed every field in the range of $-8$ to $+7$ clocks based on the data of the horizontal motion vector, so that a position of data at a sampling point one frame before in the horizontal scanning period which is outputted from the frame memory 1 is shifted by the amount of movement caused by panning.

Meanwhile, the amount of delay in the field memory 5 is changed by controlling writing/reading to/from the field memories 4 and 5 or switching an output tap of a delay amount varying shift register (not shown) provided in the succeeding stage of the field memory 5.

According to the above described conventional method of horizontal motion vector compensation, a position of data at a sampling point one frame before is shifted in units of the sampling period $T_0/2$, so that good compensation in pixel units can be carried out for a luminance signal which is not time-compressed. However, considering a case in which the same compensation as that for the luminance signal is carried out for a time-compressed color difference signal, when the time compressed color difference signal is time-expanded to be returned to the original color difference signal, erroneous compensation is carried out by data which is shifted by a distance of four times a proper distance corresponding to the amount of movement of the picture, so that non-uniformity of color occurs.

Additionally, with respect to a chrominance signal, two types of color difference signals are transmitted in a line sequential manner, so that motion vector compensation can not be carried out in 1H units in a vertical direction.

Therefore, the conventional motion vector compensation is carried out only for the luminance signal. Thus, in the horizontal blanking period during which the time-compressed color difference signal is inputted, control of the amount of delay of the frame memory based on the horizontal and vertical motion vectors is stopped, so that motion vector compensation is not carried out for the time compressed color difference signal.

Thus, in the conventional receiver, if and when the entire picture is moved in parallel by panning or the like of a camera, interframe interpolation is carried out for only a luminance signal in a reproduced image while carrying out motion vector compensation, so that the same processing as that for a motion picture portion is performed for the chrominance signal using only data received every field. Therefore, imbalance of resolution occurs between the luminance signal and the chrominance signal, so that good color reproduction is not made.

However, as described above, the HDTV signal based on the MUSE system is an TCI signal, and the chrominance signal is time-compressed to ¼ in the horizontal direction and multiplexed in a line sequential manner in the vertical direction, as compared with the luminance signal. Therefore, the same interpolation as that for the luminance signal can not be carried out for the chrominance signal using data of the motion vector produced based on the luminance signal on the side of transmission without any modification.

Japanese Patent Laying-Open Gazette No. 189893/1987 discloses a method of and an apparatus for carrying out motion vector compensation for a chrominance signal. According to this method, the chrominance signal is first time-expanded. Thus, interframe interpolation is carried out for two chrominance signals which come to have the same time axis as that of a luminance signal, based on data of a motion vector. In this case, processing performed when motion vector compensation corresponds to a shifting amount by even-numbered lines differs from processing performed when it corresponds to a shifting amount by odd-numbered lines.

SUMMARY OF THE INVENTION

An object of the present invention is to provide a method of and an apparatus for motion vector compensation in which imbalance of resolution does not occur between a luminance signal and a chrominance signal, so that good color reproduction can be made.

Another object of the present invention is to provide a method of ad an apparatus for motion vector compensation in which interframe interpolation can be carried out for a chrominance signal when the entire picture is moved in parallel.

Another object of the present invention is to provide a method of and an apparatus for carrying out motion vector compensation for a chrominance signal included in an HDTV signal with simple construction.

Still another object of the present invention is to provide a method of and an apparatus for carrying out horizontal motion vector compensation for a chrominance signal included in an HDTV signal.

A further object of the present invention is to provide a method of and an apparatus for carrying out vertical motion vector compensation for a chrominance signal included in an HDTV signal.

In order to attain the above described objects, the method of motion vector compensation according to the present invention comprises the steps of finding whether or not the remainder obtained by dividing the amount of a vector indicated by a motion vector signal by a predetermined number is 0, and determining a chrominance signal to be inserted into a position to be interpolated in the present frame depending on whether or not the remainder is 0. In the step of determining the chrominance signal to be inserted, when the remainder is 0, a chrominance signal in any of the previous frames in a position spaced apart from the position to be interpolated by a distance based on the amount of the motion vector is determined as the chrominance signal to be inserted. On the other hand, when the remainder is not 0, a chrominance signal is calculated using a chrominance signal in any of the previous frames in the periphery of the position spaced apart from the position to be interpolated by the distance based on the amount of the motion vector, so that the calculated chrominance signal is determined as the chrominance signal to be inserted.

If and when the chrominance signal is a chrominance signal time-compressed at a predetermined compression rate and the motion vector signal includes a horizontal motion vector signal indicating the amount of a horizontal motion vector, the predetermined number is the reciprocal of the predetermined compression rate, and the distance based on the amount of the motion vector is a distance in a horizontal direction corresponding to a value obtained by multiplying the amount of the horizontal motion vector by the predetermined compression rate.

Thus, when the amount of the horizontal motion vector is an integral multiple of the reciprocal of the compression rate, a chrominance signal in any of the previous frames exists in a position spaced apart from the position to be interpolated in the present frame by a distance corresponding to a value obtained by multiplying the amount of the horizontal motion vector by the compression rate, so that the chrominance signal is shifted by the above described distance, to be inserted into the position to be interpolated in the present frame. In addition, when the amount of the horizontal motion vector is not an integral multiple of the reciprocal of the compression rate, a chrominance signal in any of the previous frames does not exist in the position spaced apart from the position to be interpolated in the present frame by the distance corresponding to the value obtained by multiplying the amount of the horizontal motion vector by the compression rate, so that a chrominance signal is calculated using the chrominance signal in any of the previous frames which exists in the periphery of the position, whereby the calculated chrominance signal is shifted by the above described distance, to be inserted into the position to be interpolated in the present frame.

Thus, when the time compressed chrominance signal is time-expanded, to be returned to the chrominance signal, horizontal motion vector compensation can be carried out in pixel units, similarly to the luminance signal.

On the other hand, if and when the chrominance signal comprises two types of color difference signals transmitted in a line sequential manner and the motion vector signal comprises a vertical motion vector signal indicating the amount of a vertical motion vector, the amount of the motion vector is a distance in a vertical direction corresponding to the amount of the vertical motion vector.

Thus, when the amount of the vertical motion vector is an integral multiple of 2, the same type of color difference signal one frame before as the color difference signal which exists on a line to which the position to be interpolated belongs exists in a position spaced apart from a position to be interpolated in the present frame by a distance corresponding to the amount of the vertical motion vector, so that the color difference signal one frame before is shifted by the above described distance, to be inserted into the position to be interpolated in the present frame. On the other hand, when the amount of the vertical motion vector is not integral multiple of 2, a different type of color difference signal from the color difference signal which exists on a line to which the position to be interpolated belongs exists in the position spaced apart from the position to be interpolated in the present frame by the distance corresponding to the amount of the vertical motion vector, so that a color difference signal in the position is calculated using the same type of color difference signal one frame before which exists in the periphery of the position spaced by the distance, whereby the calculated color difference signal is shifted by the above described distance, to be inserted into the position to be interpolated in the present frame.

Thus, vertical motion vector compensation can be carried out for the color difference signal transmitted in a line sequential manner.

In particular, since an interpolation pixel calculated by a color difference signal in the previous frame is inserted into the color difference signal in the present frame, it is possible that only the color difference signal in the present frame and the color difference signal in the previous frame exist on the frame memory and a color difference signal two or more frames before does not remain. As a result, there is avoided a fact that an old pixel remains so that an image is doubled at the time of motion vector compensation.

As described in the foregoing, according to the present invention, a signal to be inserted into a chrominance signal in the present frame is obtained from a chrominance signal in the previous frame in accordance with the amount of a motion vector, so that horizontal and vertical motion vector compensation can be carried out for the chrominance signal, as for a luminance signal.

Thus, when the entire picture is moved in parallel by panning or the like of a camera, interframe interpolation is carried out for the luminance signal and the chrominance signal, so that good color reproduction with high resolution can be made.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 9 is a diagram for explaining a register length in the apparatus shown in FIG. 7 and interpolation characteristic of a spacial filter corresponding to each value of the amount of a horizontal motion vector;

FIG. 9B is a block diagram showing another example of an apparatus for carrying out horizontal motion vector compensation for a luminance signal and a chrominance signal;

FIG. 12 is a diagram for explaining states of switches corresponding to respective values of the amount of a vertical motion vector in the apparatus shown in FIG. 11.

DESCRIPTION OF THE PREFERRED EMBODIMENTS

Referring now to the figures, embodiments of the present invention will be described in detail.

Figure 4:
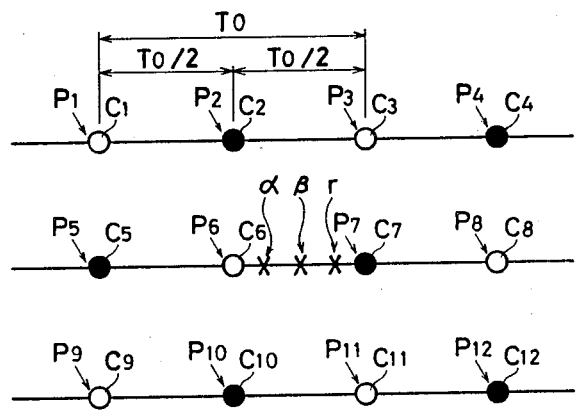
FIG. 4 is a diagram for explaining a method of horizontal motion vector compensation for a chrominance signal according to one embodiment of the present invention.

Description is now made on a method of horizontal motion vector compensation according to one embodiment of the present invention. In FIG. 4, data presented by "○ mark" is data at a sampling point of a luminance signal or a time compressed color difference signal one frame before, and data presented by "● mark" is data at a sampling point of a luminance signal or a time compressed color difference signal two frames before.

It is assumed that the luminance signal and a chrominance signal after time expansion must be moved by one pixel, two pixels or three pixels in response to a horizontal motion vector based on panning or the like of a camera in a right direction. With respect to the luminance signal, when data in a position P6 is produced by interframe interpolation, the amount of delay in a frame memory is changed by a $-1$ clock or $-2$ clocks, so that data at a position P7 and data at a position P8 are moved to the position P6, respectively. Consequently, proper compensation is carried out.

On the other hand, with respect to the time compressed color difference signal, when the data in the position P6 is produced by interframe interpolation, data at points $\alpha$, $\beta$ and $\gamma$ must be moved to the position P6 by one-fourth, two-fourths and three-fourths of a sampling interval $T_0/2$, respectively. However, data does not actually exist at a point $\alpha$, $\beta$ or $\gamma$. Thus, even if the amount of delay in the frame memory is changed in units of $T_0/2$, proper compensation is not carried out.

Meanwhile, when the color difference signal after time expansion must be moved by four pixels or eight pixels, the most suitable compensation can be carried out by changing the amount of delay in the frame memory by $-1$ clock or $-2$ clocks, respectively.

The above described data at a sampling point which does not exist can be produced using data at a peripheral sampling point which exists.

Figure 5:
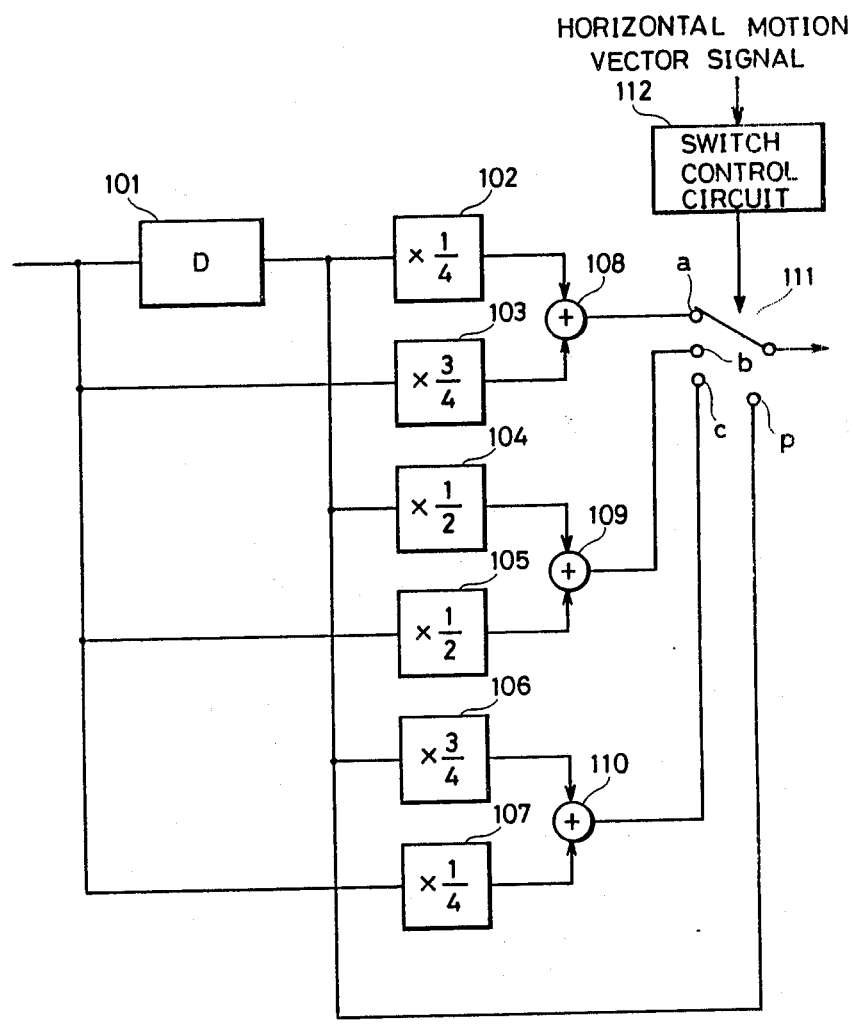
FIG. 5 is a block diagram showing one example of a structure of a filter employed for horizontal motion vector compensation for a chrominance signal.

FIG. 5 is a diagram showing one example of a filter for producing the above described data at a sampling point which does not exist.

In this filter, data at a sampling point which does not exist is produced using data at two sampling points which exist. This filter comprises a delay circuit 101 for delaying data by one clock, coefficient multiplier 102 to 107, adders 108 to 110, a switch 111 and a switch control circuit 112.

When data at the point γ is produced, the switch 111 is switched to a side of a contact c. Consequently, data obtained by adding one-fourth of data in the position P7 to three-fourths of data in the position P6 is produced as data at the point α When data at the point β is produced, the switch 111 is switched to a side of a contact b. In addition, when data at the point γ is produced, the switch 111 is switched to a side of a contact a.

When a horizontal motion vector compensation is carried out by using data at a sampling point which exists, for example, data in the position P7, the switch 11 is switched to a side of a contact p. Consequently, data outputted from the delay circuit 101 does not go through the filter.

The switch 111 is switched in response to a control signal from the switch control circuit 112. The switch control circuit 112 applies the control signal to the switch 111 in response to a horizontal motion vector signal. The switch control circuit 112 comprises a ROM (Read Only Memory), which stores contacts to which the switch 111 is to be switched corresponding to respective values of the amount of a horizontal motion vector.

Figure 6:
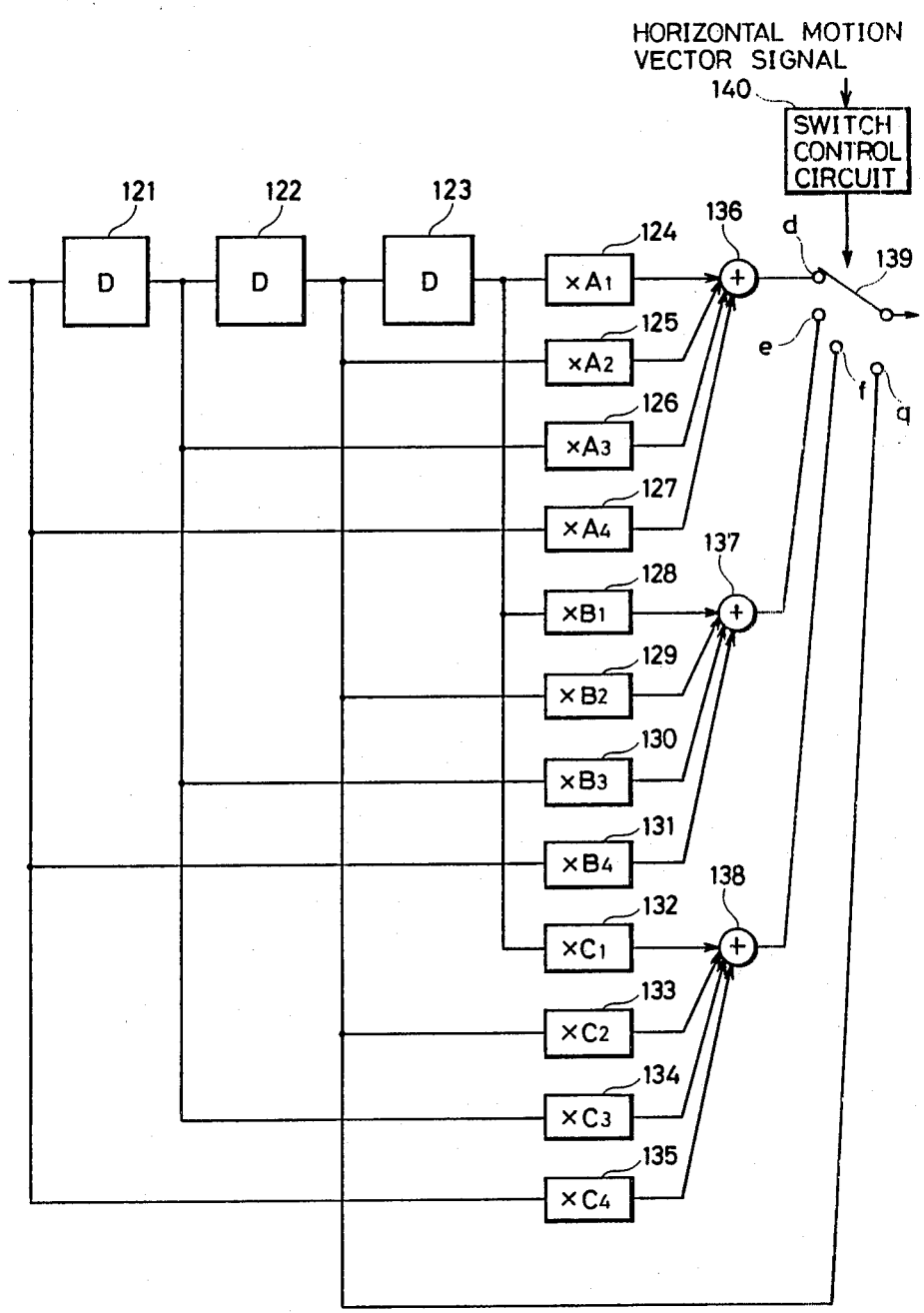
FIG. 6 is a block diagram showing another example of a structure of a filter employed for horizontal motion vector compensation for a chrominance signal.

FIG. 6 is a block diagram showing another example of a filter for producing the above described data at the sampling point which does not exist.

In this filter, data at the sampling point which does not exist is produced from data at four sampling points which exist. This filter comprises three delay circuits 121 to 123 which delay data by one clock, coefficient multipliers 124 to 135, adders 136 to 138, a switch 139 and a switch control circuit 140.

For example, when data at the point α shown in FIG. 4 is produced, the switch 139 is switched to a side of a contact d. Consequently, a value obtained by multiplying data in the position P5 by a coefficient A1, a value obtained by multiplying data in the position P6 by a coefficient A2, a value obtained by multiplying data in the position P7 by a coefficient A3 and a value obtained by multiplying data in the position P8 by a coefficient A4 are added, so that the result of the addition is outputted as data at the point α. In addition, when data at the point β is produced, the switch 139 is switched to a side of a contact e. When data at the point γ is produced, the switch 139 is switched to a side of a contact f.

When horizontal motion vector compensation is carried out by using data at a sampling point which exists, for example, data in the position P7, the switch 139 is switched to a side of a contact q. Consequently, data outputted from the delay circuit 122 does not go through the filter. Furthermore, the switch control circuit 140 comprises a ROM, similarly to the switch control circuit 112 shown in FIG. 5, which switches the switch 139 in response to a horizontal motion vector signal. The coefficient multipliers 124 to 135 may be structured by the ROM.

Meanwhile, when interpolation data in the present frame is produced by interframe interpolation, it is desirable that only data one frame before is used. If an element of data two or more frames before remains, an element of an old pixel remains, so that an image may be doubled.

For example, in FIG. 4, when the data at the point α, β or γ is produced, it is not preferable that data C7 two frames before is used. Therefore, the data in the position P7 is produced using data C3 one frame before in a position P3 and data C11 one frame before in a position P11. The data at the point α, β or γ is produced using the produced data in the position P7 and data C6 one frame before in the position P6.

Figure 7:
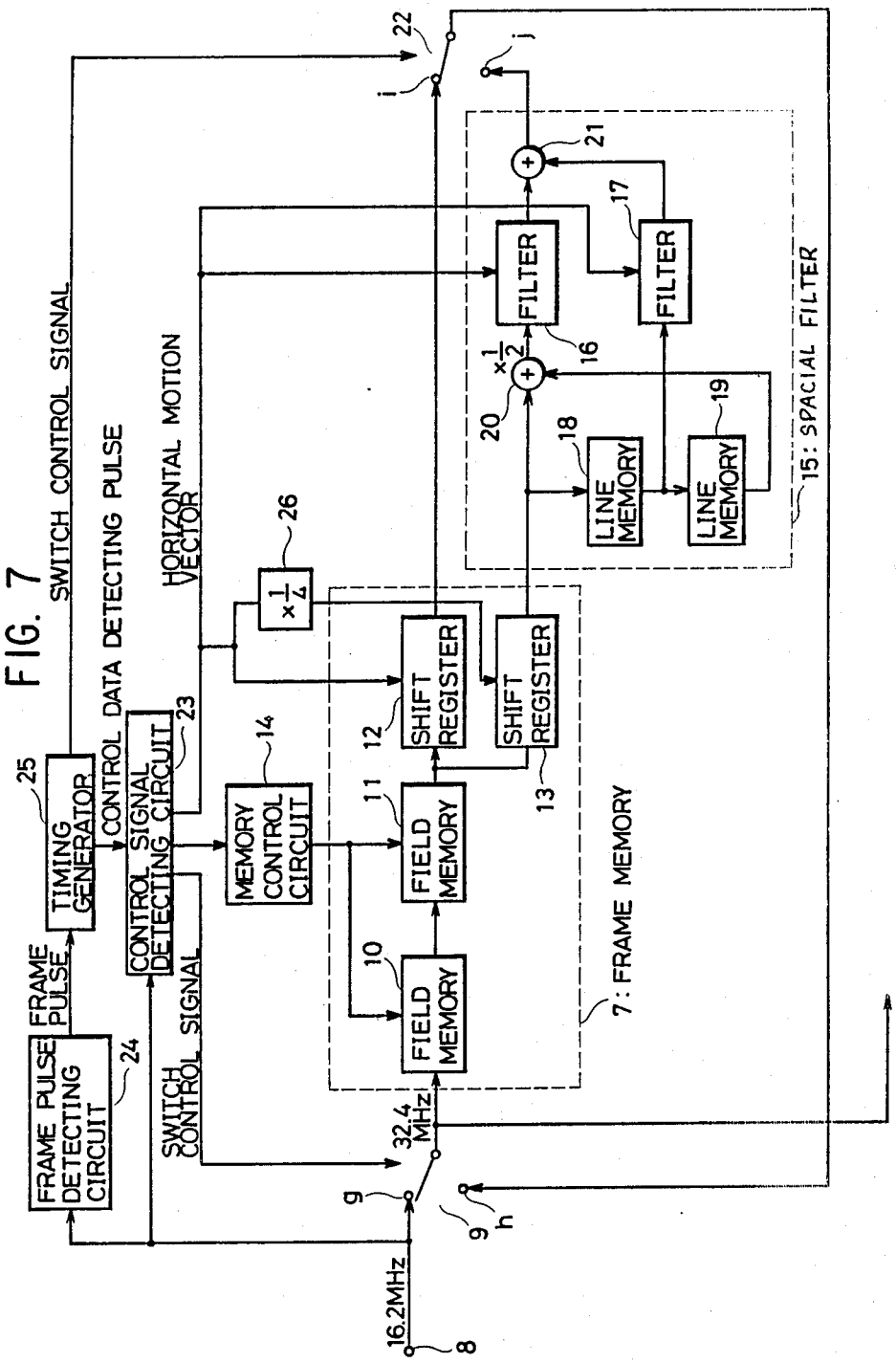
FIG. 7 is a block diagram showing one example of an apparatus for carrying out horizontal motion vector compensation for a luminance signal and a chrominance signal.

FIG. 7 is a block diagram showing a structure of a part of a receiver for an HDTV broadcasting capable of carrying out the above described horizontal motion vector compensation.

Figure 1:
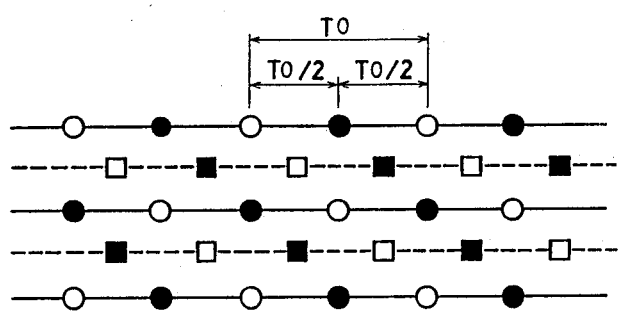
FIG. 1 is a diagram for explaining a sampling pattern based on an MUSE system.
Figure 2:
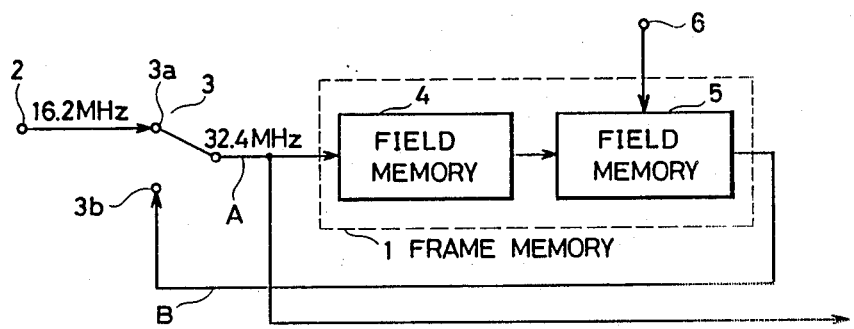
FIG. 2 is a block diagram showing an interframe interpolating circuit.
Figure 3A:
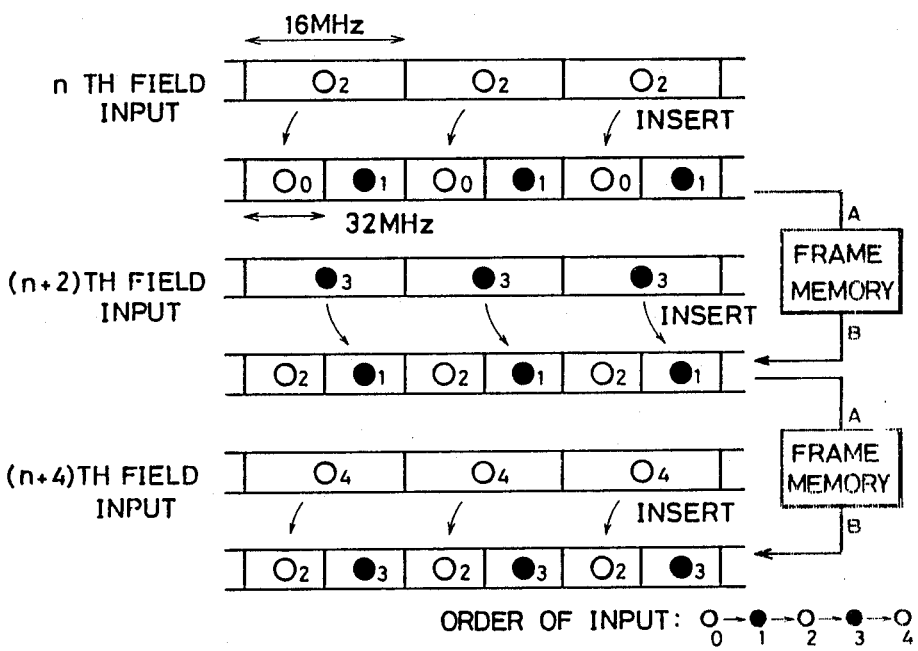
FIG. 3A is a diagram for explaining interframe interpolation.
Figure 3B:
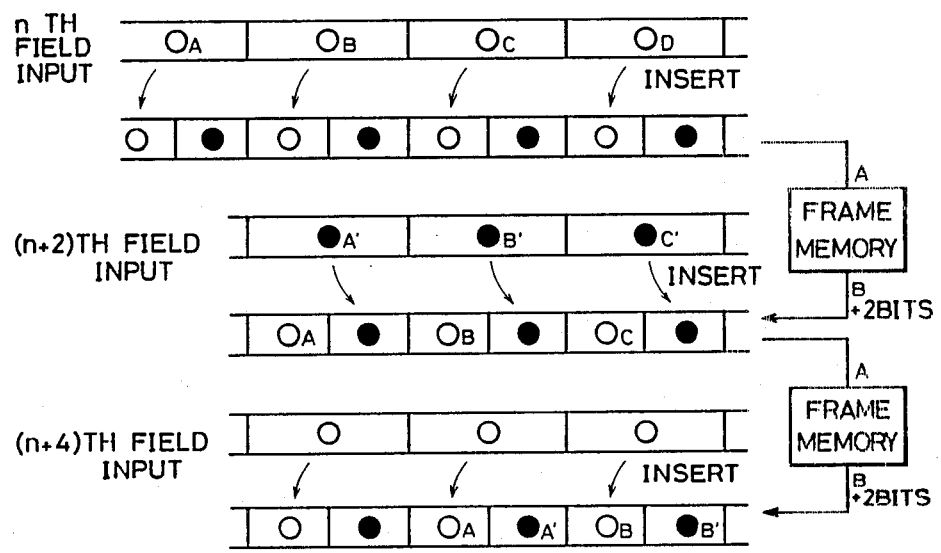
FIG. 3B is a diagram for explaining interframe interpolation at the time of horizontal motion vector compensation corresponding to +2 clocks.

In FIG. 7, an HDTV signal having a transmission sampling rate of 16.2 MHz is applied to an input terminal 8. A switch 9 is alternately switched to a side of a contact g and a side of a contact h at a clock rate 324 MHz of two times the transmission sampling rate. A frame memory 7, which corresponds to the frame memory 1 shown in FIG. 2, comprises a cascade circuit of a field memory 10 and a field memory 11, a shift register 12 for a luminance signal and a shift register 13 for a time compressed color difference signal. Each of the field memories 10 and 11 has capacity of two fields. Writing/reading of the field memories 10 and 11 is controlled by address control of a memory control circuit 14 as described below. In addition, the respective amounts of the shift registers 12 and 13 are variable. The amounts of delay are controlled based on a horizontal motion vector applied from a control signal detecting circuit 23 as described below.

A spacial filter 15 is a two-dimensional spacial filter structured by a transversal filter. The spacial filter 15 comprises two transversal filters 16 and 17, two line memories 18 and 19, and two adders 20 and 21. The line memory 18 delays an output signal of the shift register 13 by 2 H, to apply the same to the line memory 19 and the filter 17. The line memory 19 delays an output signal of the line memory 18 by 2 H, to apply the same to the adder 20. The adder 20 adds the output signal of the shift register 13 to an output signal of the line memory 19, to apply a signal obtained by the addition to the filter 16. The adder 21 adds an output signal of the filter 16 to an output signal of the filter 17, to output a signal obtained by the addition. Tap coefficients of the filters 16 and 17 are switched based on the horizontal motion vector from the control signal detecting circuit 23.

An output signal of the shift register 12 is applied to a contact i of a switch 22, and an output signal of the adder 21 in the spacial filter 15 is applied to a contact j thereof. The switch 22 is switched to a side of the contact i at timings at which the luminance signal is inputted while being switched to a side of the contact j at timings at which the time compressed color difference signal is inputted. An output signal of the switch 22 is fed back to the contact h of the switch 9. Consequently, the luminance signal and the time compressed color difference signal which are applied to the input terminal 8 are combined with a luminance signal and a time compressed color difference signal one frame before which are outputted from the switch 22, a signal obtained by combination being applied to the frame memory 7.

A frame pulse detecting circuit 24 detects a frame pulse included in the HDTV signal applied to the input terminal 8. A timing generator 25 is responsive to the frame pulse outputted from the frame pulse detecting circuit 24 for generating timing signals such as a switch control signal and a control data detecting pulse. The switch 22 is alternately switched to the side of the contact i and the side of the contact j in response to the switch control signal from the timing generator 25.

Additionally, the control signal detecting circuit 23 is responsive to the control data detecting pulse from the timing generator 25 for detecting a control signal indicating a horizontal motion vector, a sampling phase or the like. This control signal detecting circuit 23 generates the switch control signal for switching the switch 9 based on the detected sampling phase. In addition, this control signal detecting circuit 23 applies data of the detected vertical motion vectors to the memory control circuit 14. The memory control circuit 14 applies write and read addresses to the field memories 10 and 11 based on the data of the vertical vectors.

Furthermore, the control signal detecting circuit 23 applies the data of the detected horizontal motion vector to the shift register 12, and to the shift register 13 through a coefficient multiplier 26. In addition, the control signal detecting circuit 23 applies the horizontal motion vector to the filters 16 and 17. The filters 16 and 17 have structures shown in, for example, FIGS. 5 and 6.

Figure 8:
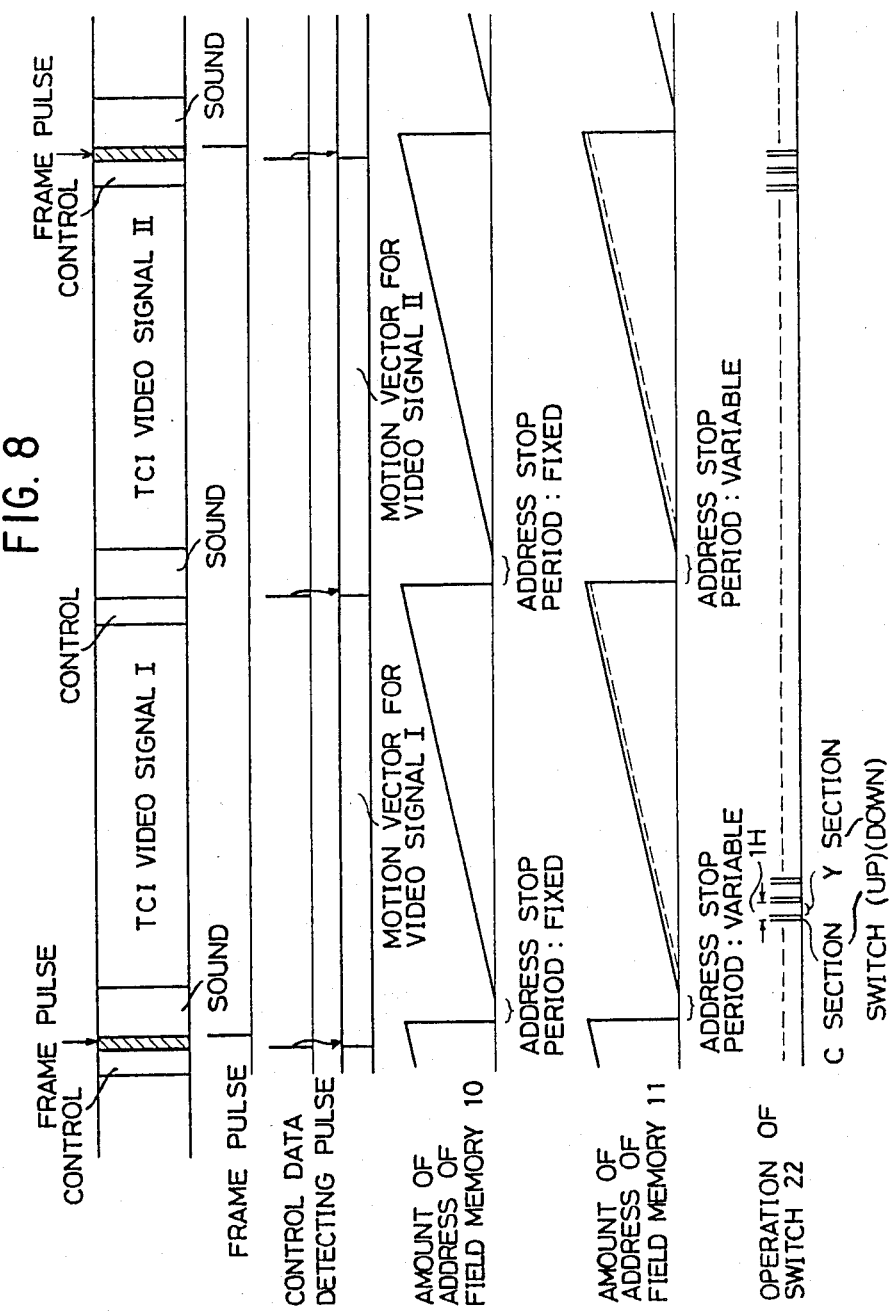
FIG. 8 is a waveform diagram showing timings of various signals in the apparatus shown in FIG. 7.

Referring now to a waveform diagram of FIG. 8, description is made on an operation of the receiver shown in FIG. 7.

The timing generator 25 controls all timings on the basis of the frame pulse detected by the frame pulse detecting circuit 24. More specifically, the control signal detecting circuit 23 detects data of the horizontal and vertical motion vectors included in the HDTV signal in response to a control data detecting pulse generated from the timing generator 25. In addition, the memory control circuit 14 applies the write and read addresses to the field memories 10 and 11 in response to the control signal applied from the control signal detecting circuit 23.

Meanwhile, since timings of the time compressed color difference signal applied to the switch 22 are delayed, as compared with those of the luminance signal, based on processing of the spacial filter 15 as described below, the address control circuit 14 makes different from each other timings for writing and reading of the field memories 10 and 11 with respect to the luminance signal and timings for writing and reading of the field memories 10 and 11 with respect to the time compressed color difference signal.

The timings for writing and reading are controlled by making variable timings for applying the write and read addresses to the field memory 11, as shown in FIG. 8. When the delay time caused by the processing of the spacial filter 15 is, for example, approximately 1 H, the amount of delay of each of the field memories 10 or 11 with respect to the luminance signal is increased by approximately 1 H, as compared with that with respect to the time compressed color difference signal, so that the delay time is cancelled.

Data at sampling points of the luminance signal, and the time compressed color difference signal in the horizontal blanking period, in each field which are included in the received HDTV signal and data at sampling points of a luminance signal and a time compressed color difference signal approximately one frame before which are outputted from the switch 22 are inputted to the field memory 10 through the switch 9 which are switched at the clock rate 32.4 MHz. Therefore, data corresponding to two fields subjected to interframe interpolation are written to the field memory 10 as data corresponding to one field at sampling intervals of $T_0/2$.

Furthermore, the data at the sampling points, corresponding to two fields, of the luminance signal and the time compressed color difference signal which are written to the field memory 10 are delayed by approximately one frame, respectively, based on control of writing/reading of the field memories 10 and 11 by the memory control circuit 14.

Additionally, on this occasion, vertical vector compensation is carried out by the memory control circuit 14 based on the data of the vertical motion vector detected by the control signal detecting circuit 23.

On the other hand, the respective register lengths (the number of steps) of the shift registers 12 and 13 are adjusted every field in response to the data of the horizontal motion vector detected by the control signal detecting circuit 23. The data of the horizontal motion vector is changed in the range of $-8$ to $+7$ clocks in units of the sampling interval $T_0/2$. When the respective register lengths of the shift registers 12 and 13 are increased or decreased by the unit length 1, the respective amounts of the shift registers 12 and 13 are increased or decreased by one clock. It is assumed that the respective register lengths of the shift registers 12 and 13 are 0 when the data of the horizontal motion vector is $+0$, that is, when there is no movement of a picture.

The register length of the shift register 12 is changed in the range of $-8$ to $+7$ clocks every field depending on the amount of the horizontal motion vector so that the horizontal motion vector compensation for the luminance signal is performed. Furthermore, in order to perform the horizontal motion vector compensation for the color difference signal, data obtained by multiplying the data of the horizontal motion vector by a time compression rate $(=\frac{1}{4})$ as well as raising fractions or omitting emitting fractions depending on the positive and the negative is applied to the shift register 13. As a result, the register length of the shift register 13 is changed in the range of $-2$ to $+2$ clocks every field in response to the data. Therefore, the range of the amount of delay of the color difference signal to occur when the time-axis is returned to its normal position is equal to the range of the amount of delay of the luminance signal.

Thus, in the frame memory 7, the received luminance signal and time compressed color difference signal in each field are delayed by approximately one frame. Thereafter, the respective register length of the shift registers 12 and 13 are adjusted, so that the amount of delay relative to the luminance signal is changed every field in the range of $-8$ to $+7$ times the sampling interval $T_0/2$ in response to the horizontal motion vector. In addition, the amount of delay relative to the time compressed color difference signal is changed every field in the range of $-2$ to $+2$ times the sampling interval $T_0/2$.

Data at a sampling point of the luminance signal approximately one frame before which is outputted from the shift register 12 is combined with data at a sampling point of the luminance signal in the present field which is applied to the input terminal 8. Thus, the movement of the luminance signal in a horizontal direction is compensated for in response to the horizontal motion vector in units of an interval between pixels which is the sampling interval $T_0/2$ by control of the amount of delay in the frame memory 7, as in the conventional example.

On the other hand, data at a sampling point of the time compressed color difference signal approximately one frame before which is outputted from the shift register 13 is moved in the horizontal direction in the range of $-2$ to $+2$ clocks where a compensation range of the luminance signal is compressed by approximately the time compression rate. Consequently, when the time compressed color difference signal is time-expanded, to be returned to the original chrominance signal, the data is moved in the horizontal direction in the range of $-8$ to $+8$ pixels, which is approximately the same as a movable range of $-8$ to $+7$ pixels of the luminance signal, in units of a cycle in four times the sampling interval $T_0/2$, i.e, $(32.4/4=)$ 8 MHz. The data at the sampling point of the time compressed color difference signal approximately one frame before which is outputted from the shift register 13 is outputted to the switch 9 through the switch 22, to be combined with the data at the sampling point of the time compressed color difference signal in the present field which is applied to the input terminal 8. In this case, the movement of the time compressed color difference signal in the horizontal direction is roughly compensated for in the range of $-2$ to $+2$ clocks by the frame memory 7 in units of an interval of four times the pixel unit. Thus, when the time compressed color difference signal is time-expanded, the movement in the horizontal direction is roughly compensated for in response to the horizontal motion vector in four pixel units, i.e, with an error of four times the luminance signal.

In order to make the error of compensation of the chrominance signal identical to that of the luminance signal and raise resolution of the chrominance signal to resolution of the luminance signal, the data at the sampling point of the time compressed color difference signal which is outputted from the shift register 13 is inputted to the spacial filter 15. In the spacial filter 15, the above described data at the sampling point which does not exist is produced by one-dimensional or two-dimensional spacial filter processing using data at a peripheral sampling point which exists. For example, the data at the point $\alpha$, $\beta$ or $\gamma$ shown in FIG. 4 is produced using any of the peripheral data C1 to C12.

Since the time compressed color difference signal comprises two types of time compressed color difference signals transmitted in a line sequential manner, the data of the time compressed color difference signal outputted from the shift register 13 is delayed by 2 H by the line memories 18 and 19, respectively, to be applied to the adder 20. Consequently, the data of the time compressed color difference signal applied from the shift register 13 and data 4 H before which is applied from the line memory 19 are added to each other by the adder 20, the result of the addition being inputted to the filter 16. As a result, in, for example, FIG. 4, the data C11 in the present line and the data C3 4 H before are added to each other, so that the data in the position P7 is produced. In addition, the data 2 H before which is outputted from the line memory 18 is inputted to the filter 17. On this occasion, the tap coefficients of the filters 16 and 17 are respectively switched every field to predetermined values in response to the data of the horizontal motion vector. Data processed by the filters 16 and 17 are combined with each other by the adder 21. As a result, data of the time compressed color difference signal transversely processed in a two-dimensional manner is outputted to the switch 9 through the switch 22.

Figure 9A:
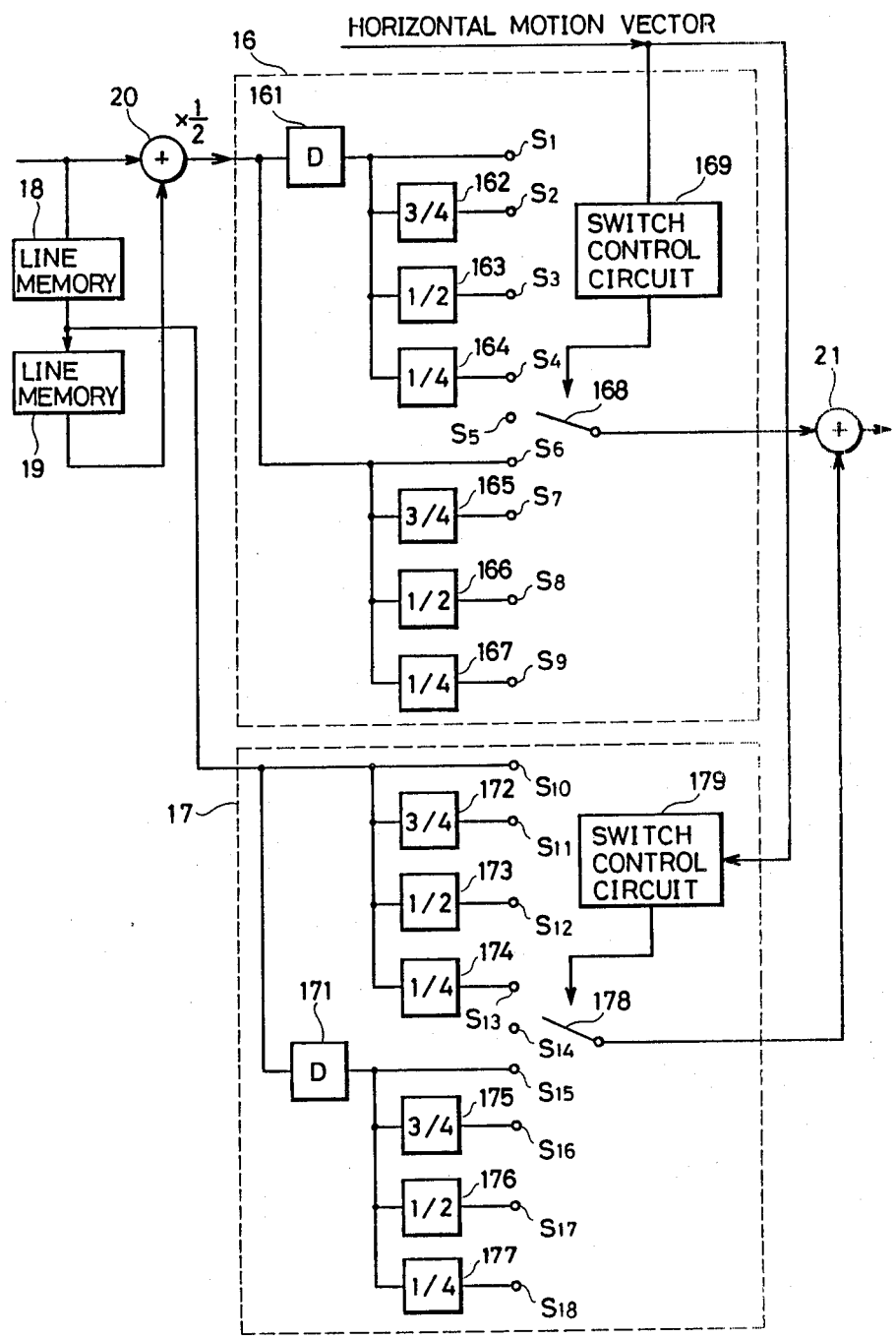
FIG. 9A is a block diagram showing an example of a specific structure of filters 16 and 17 shown in FIG. 7.

FIG. 9A shows an example of a specific structure of the filters 16 and 17. The filter comprises a delay circuit 161, coefficient multipliers 162 to 167, a switch 168, and a switch control circuit 169. The filter 17 comprises a delay circuit 171, coefficient multipliers 172 to 177, a switch 178, and a switch control circuit 179. The switch control circuits 169 and 179 switches 168 and 178 to any of contacts S1 to S9 and any of contacts S10 to S18 in response to the amount of the horizontal motion vector.

Interpolation characteristics of the spacial filter 15 is set in accordance with switching of the tap coefficients of the filter 16 and 17, as shown in FIG. 9. More specifically, when the amount of the horizontal motion vector is $+7$, $+3$, $-1$ or $-5$, the data at the point $\alpha$ is produced using peripheral data one frame before. For example, when the amount of the horizontal motion vector is $+3$, the switch 168 of the filter 16 is switched to a side of the contact S2 and the switch of the filter 17 is switched to a side of the contact S13. The register length of the shift register 13 is set to $+2$, $+1$, 0 or $-1$ based on the amount of the horizontal motion vector $+7$, $+3$, $-1$ or $-5$. Consequently, data at a sampling point of the time compressed color difference signal roughly compensated for is finely compensated for in units of one-fourth the sampling interval $T_0/2$. Meanwhile, when the amount of the horizontal motion vector is a multiple of 4, the interpolation characteristic based on the spacial filter 15 becomes 0, so that compensation by the spacial filter 15 is not carried out.

Meanwhile, the register length of the shift register 13 based on the amount of the horizontal motion vector and data concerning the interpolation characteristic of the spacial filter 15 are stored in advance in ROMs respectively included in the shift registers 12 and 13 and the filters 16 and 17.

Thus, the time compressed color difference signal subjected to interframe interpolation is processed by a circuit in the succeeding stage (not shown) while horizontal motion vector compensation is carried out, similarly to the luminance signal, so that an image of a reproduced picture is formed. As a result, even when the entire picture is moved in the horizontal direction by panning or the like or a camera, the luminance signal and the time compressed color difference signal are processed as a still picture portion except for ends of the picture. More specifically, since the same interframe interpolation as that for the luminance signal is carried out for the time compressed color difference signal, the resolution of the chrominance signal is increased. As a result, good color reproduction is made, so that natural color reproduction of a still object is made.

Although in the above described embodiment, the shift registers 12 and 13 are employed for controlling the amount of delay in the frame memory 7, the amount of delay may be changed by, for example, controlling writing/reading of the field memories 10 and 11. In this case, the shift registers 12 and 13 can be omitted.

Additionally, although in the above described embodiment, fine adjustment of the horizontal motion vector is made using the two-dimensional spacial filter 15, fine adjustment can be made using, for example, a one-dimensional spacial filter comprising a single transversal filter.

Meanwhile, in the embodiment shown in FIG. 7, a color difference signal two frames before is not used. If the color difference signal two frame before is used, shift of a picture may occur. However, the circuit structure becomes simple. FIG. 9B shows a structure of a receiver for HDTV broadcasting which carries out horizontal motion vector compensation also using the color difference signal two frames before.

In FIG. 9B, the same portions as those shown in FIG. 7 have the same reference numerals. The switch 601 is switched to one contact in a period during which the color difference signal is inputted while being switched to the other contact in a period during which the luminance signal is inputted. In the example shown in FIG. 9B, one shift register (line memory) 602 is used in common for delay of the chrominance signal and delay of the luminance signal. The structure as shown in, for example, FIG. 5 or 6 is used as the filter.

Description is now made on a method of vertical vector compensation according to another embodiment of the present invention.

Figure 10:
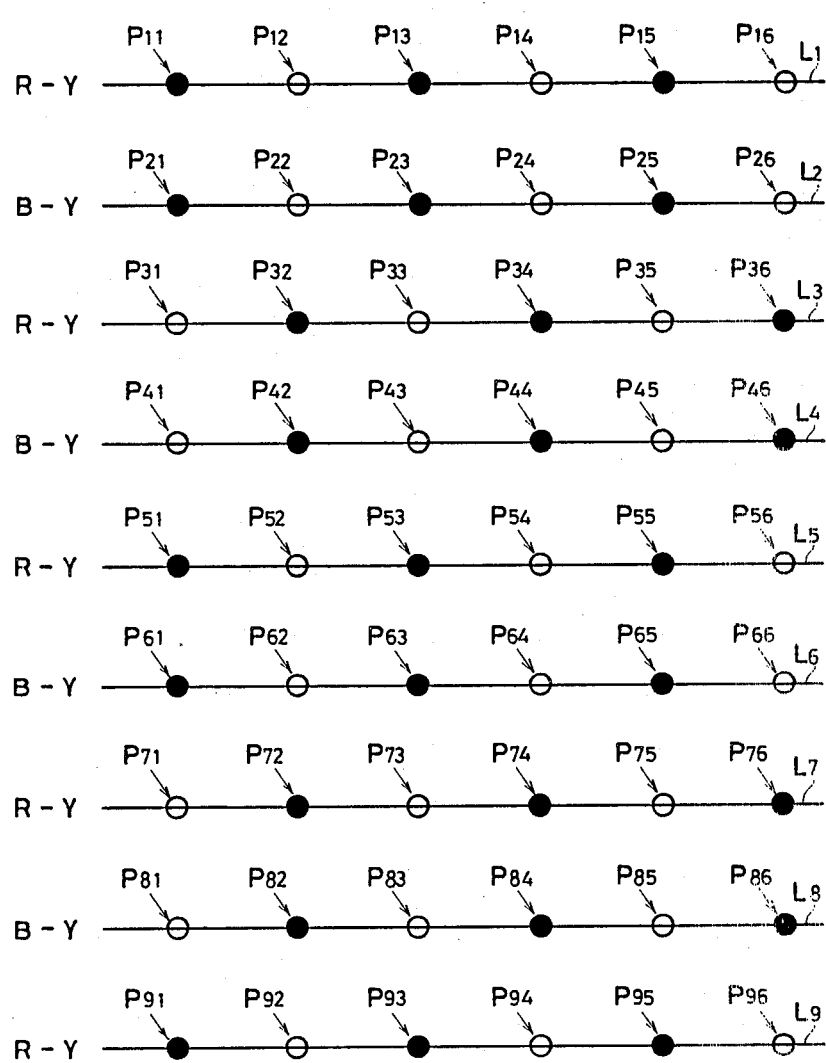
FIG. 10 is a diagram for explaining a method of vertical motion vector compensation for a chrominance signal according to another embodiment of the present invention.

FIG. 10 is a diagram showing sampling patterns of a color difference signal based on an MUSE system. In FIG. 10, only fields in odd numbers or fields in even numbers are illustrated. As shown in FIG. 10, two color difference signals (R-Y) and (B-Y) are multiplexed on an HDTV signal in a line sequential manner. In FIG. 10, data represented by "○ mark" is data at a sampling point of a color difference signal two frames before, and data represented by "● mark" is data at a sampling point of the color difference signal one frame before.

Consider a case in which vertical motion vector compensation is carried out by −1 H in response to data of a vertical motion vector. In this case, data one frame before on a line L6 is inserted into, for example, a line L5. However, since the line L5 comprises the color difference signal (R-Y) and the line L6 comprises the color difference signal (R-Y), data one frame before in a position P63 can not be inserted into a position P53, for example. Therefore, for example, the data in the position P63 is produced using data one frame before in a position P53, a position P72 and a position P74, to be inserted into the position P53.

Then, when vertical motion vector compensation is carried out by −2H, data one frame before on a line L7 is inserted into the line L5. However, for example, data in a position P73 is data two frames before, data one frame before in the position P73 is produced using the data in the positions P72 and P74, to be inserted into the position P53.

When vertical vector compensation by −3H is carried out, for example, data one frame before in a position P83 is produced using data one frame before in the position P72, the position P74 and a position P93, to be inserted into the position P53. When vertical vector compensation by +1H is carried out, for example, data one frame before in a position P43 is produced using data one frame before in a position P32, a position P34 and the position P53, to be inserted into the position P53. When vertical vector compensation by +2H is carried out by, data one frame before in a position P33 is produced using data one frame before in the positions P32 and P34, to be inserted into the position P53. When vertical motion vector compensation by +3H is carried out, data one frame before in a position P23 is produced using data one frame before in a position P13, the position P32 and the position P34, to be inserted into the position P53. When vertical vector compensation by −4H is carried out, data of the color difference signal (R-Y) one frame before in the position P93 is inserted into the position P53 without any modification.

Thus, the amount of delay of the frame memory 30 is adjusted in units of 1H based on the amount of the vertical motion vector, so that motion vector compensation is carried out for a line sequential color difference signal in a vertical direction. On this occasion, a signal to be inserted is produced using a peripheral color difference signal such that the same type of color difference signal in the previous frame is inserted into the color difference signal in the present frame. Consequently, vertical motion vector compensation can be carried out for the line sequential color difference signal. In particular, since an interpolation pixel comprising the color difference signal in the previous frame is inserted into the color difference signal in the present frame, only the color difference signal in the present frame and the color difference signal in the previous frame exist in the frame memory 30, so that color difference signals two or more frames before do not remain. Thus, there is avoided a fact that an old pixel remains so that an image is doubled at the time of vertical motion vector compensation.

Figure 11:
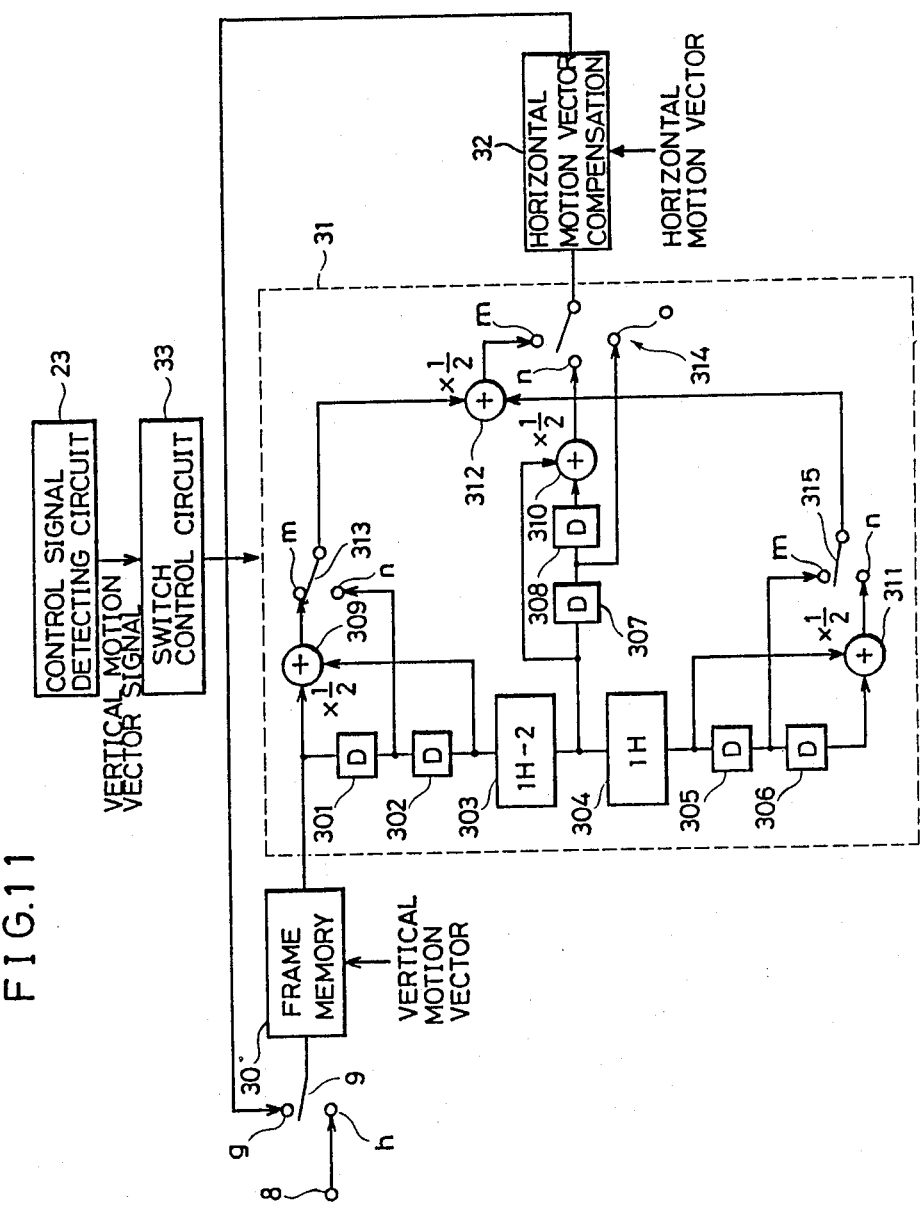
FIG. 11 is a block diagram showing one example of an apparatus for carrying out vertical motion vector compensation for a luminance signal and a chrominance signal.

FIG. 11 is a block diagram showing a structure of a part of an HDTV receiver for HDTV broadcasting capable of carrying out the above described vertical motion vector compensation. An interpolating circuit 31 shown in FIG. 11 is connected between the field memory 11 and the shift registers 12 and 13 shown in FIG. 7. A frame memory 30 corresponds to the field memories 10 and 11 shown in FIG. 7, and a horizontal motion vector compensating circuit 32 corresponds to the shift registers 12 and 13, the spacial filter 15, and the switch 22 shown in FIG. 7.

In FIG. 11, a video signal in the present frame is inputted to an input terminal 8, to be applied to a contact h of a switch 9. A video signal comprising a signal one frame before and a signal two frames before which are subjected to vertical and horizontal motion vector compensation is applied to a contact g of the switch 9. In an operation of the switch 9, interframe interpolation is carried out using the video signal in the present frame and the video signal in the previous frame. Consequently, a signal subjected to interframe interpolation is inputted to the frame memory 30 from the switch 9. Data of a vertical motion vector is applied to memory 30 is increased or decreased in the range of −4H to +3H in units of 1H based on the data of the vertical motion vector.

In the conventional MUSE receiver, the amount of delay in the frame memory 30 is increased or decreased only with respect to a luminance signal while it is not increased or decreased only with respect to a color difference signal. Therefore, address control of the frame memory 30 with respect to the luminance signal and address control of the frame memory 30 with respect to the color difference signal must be separately performed. Thus, a control circuit is forced to be large. For example, an address counter for the luminance signal and an address counter for the color difference signal must be separately provided. However, according to the receiver shown in FIG. 11, address control of the frame memory 30 is controlled in common with respect to the luminance signal and the color difference signal. More specifically, vertical motion vector compensation is carried out for the luminance signal and the color difference signal by the same amount. Therefore, the control circuit for address control of the frame memory 30 becomes simple.

Thus, a video signal delayed based on the data of the vertical motion vector is inputted to the interpolating circuit 31. In the interpolating circuit 31, an interpolating operation is performed with respect to the line sequential color difference signal. More specifically, vertical motion vector compensation for the luminance signal is carried out by only control of the amount of delay in the frame memory 30 while vertical motion vector compensation for the color difference signal is carried out by the frame memory 30 and the interpolating circuit 31. The interpolating circuit 31 comprises flip-flops 301, 302, 305, 306, 307 and 308 which provide a delay of one clock, a delay line 303 which provides delay of less than 1H by two clocks, a delay line 304 which provides delay of 1H, adders 309 to 312, and switches 313 to 315. The switches 313 to 315 are switched by a switch control circuit 33. The switch control circuit 33 is responsive to a vertical motion vector signal applied from a control signal detecting circuit 23 for switching the switches 313 to 315 to predetermined states, respectively.

When the luminance signal is inputted to the input terminal 8, the switch 314 is connected to a side of a contact o. In this case, the luminance signal is not interpolated, to be inputted to the horizontal motion vector compensating circuit 32 in the next stage. Meanwhile, in the interpolating circuit 31, the luminance signal involves delay of (1H+1) clocks by the flip-flops 301 and 302, the delay line 303 and the flip-flop 307. Therefore, the amount of delay in the frame memory 30 is set less by the delay.

Operations of the switches 313 to 315 to occur when the color difference signal is inputted to the input terminal 8 are set based on the vertical motion vector, as shown in FIG. 12. For example, when vertical motion vector compensation by −1H is carried out for the color difference signal, the switches 313 to 315 are all connected to a side of a contact m. On this occasion, the amount of delay in the frame memory 30 is set less, by 1H, than that set when vertical motion vector compensation is not carried out. Consequently, an interpolation signal given by the following expression is inserted into, for example, the position P53 in FIG. 10:

$$C53\times(\tfrac{1}{2})+(C72+C74)\times(\tfrac{1}{4})$$

where C11 to C96 denote data of pixels in positions P11 to P96, respectively.

Consequently, a color difference signal (R-Y) in the position P63 is obtained from data of a color difference signal in the previous frame.

When vertical motion vector compensation by −2H is carried out by −2H, the amount of delay in the frame memory 30 becomes less by 2H and the switch 314 is connected to a side of a contact n. Consequently, data given by the following expression is inserted into the position P53 shown in FIG. 10:

$$(C72+C74)\times(\tfrac{1}{2})$$

Similarly, when vertical motion vector compensation by −3H is carried out, a signal obtained by the following expression is inserted into the position P53:

$$C93\times(\tfrac{1}{2})+(C72+C74)\times(\tfrac{1}{4})$$

When vertical motion vector compensation by +1H is carried out, a signal obtained by the following expression is inserted into the position P53:

$$C53\times(\tfrac{1}{2})+(C32+C34)\times(\tfrac{1}{4})$$

When vertical motion vector compensation by +2H is carried out, a signal obtained by the following expression is inserted into the position P53:

$$(C32+C34)\times(\tfrac{1}{2})$$

when vertical motion vector compensation by +3H is carried out, a signal obtained by the following expression is inserted into the position P53:

$$C13\times(\tfrac{1}{2})+(C32+C34)\times(\tfrac{1}{4})$$

When vertical motion vector compensation is carried out by −4H, the amount of delay in the frame memory 30 is made less by 4H and the switch 314 is connected to the side of the contact o. Consequently, data in the position P93 is inserted into the position P53. In addition, when vertical motion vector compensation is not carried out, the switch 314 is connected to the side of the contact o. In this case, the amount of delay from an input terminal of the frame memory 30 to an output terminal of the horizontal motion vector compensating circuit 32 including a basic amount of delay, i.e., (1H+1) clocks in the interpolating circuit 5 is set to the amount of delay of one frame.

As described in the foregoing, a color difference signal which is subjected to vertical motion vector compensation by the frame memory 30 and the interpolating circuit 31 is subjected to horizontal motion vector compensation based on data of the horizontal motion vector by the horizontal motion vector compensating circuit 32 and then, applied to a contact g of the switch 9. As a result, interframe interpolation is carried out by the color difference signal in the present frame and the color difference signal in the previous frame.

A structure of the interpolating circuit 31 is not limited to the structure shown in FIG. 11. More specifically, if pixels of the same types of colors in the same frame are used, interpolation may be carried out using still more pixels. For example, when vertical motion vector compensation is carried out by −1H, pixels in the positions P51, P55, P70 and P76 may be used other than pixels in the positions P53, P72 and P74. In addition, coefficients used for an operation may be coefficient other than $\tfrac{1}{2}$ and $\tfrac{1}{4}$ in the above described embodiment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of motion vector compensation carrying out compensation for a chrominance signal included in a received television signal based on an MUSE system in response to a motion vector signal multiplexed on said television signal, comprising the steps of:
    finding whether or not the remainder obtained by dividing the amount of a vector indicated by said motion vector signal by a predetermined number is 0, and determining a chrominance signal to be inserted in a position to be interpolated in the present frame depending on whether or not said remainder is 0, in said step of determining a chrominance signal to be inserted, a chrominance signal in any of the previous frames in a position spaced apart from said position to be interpolated by a distance based on said amount of the motion vector being determined as said chrominance signal to be inserted when said remainder is 0 while a chrominance signal being produced using a chrominance signal in any of the previous frames in the periphery of the position spaced apart from said position to be interpolated by the distance based on said amount of the motion vector and the produced chrominance signal being determined as said chrominance signal to be inserted when said remainder is not 0.

2. The method according to claim 1, wherein said chrominance signal is a chrominance signal time-compressed at a predetermined compression rate, said motion vector signal includes a horizontal motion vector signal indicating the amount of a horizontal motion vector, said predetermined number is the reciprocal of said predetermined compression rate, and said distance based on said amount of the motion vector is a distance in a horizontal direction corresponding to a value obtained by multiplying said amount of the horizontal motion vector by said predetermined compression rate.

3. The method according to claim 1, wherein said chrominance signal is a chrominance signal time-compressed at a predetermined compression rate, said motion vector signal includes a horizontal motion vector signal indicating the amount of a horizontal motion vector, said predetermined number is a value obtained by multiplying the reciprocal of said predetermined compression rate by the number of frames required for one circulation of a sampling pattern, said distance based on said amount of the motion vector is a distance in a horizontal direction corresponding to a value obtained by multiplying said amount of the horizontal motion vector by said predetermined compression rate, and said chrominance signal in any of the previous frames is a chrominance signal one frame before.

4. The method according to claim 1, wherein said chrominance signal comprises first and second color difference signals transmitted in a line sequential manner said motion vector signal includes a vertical motion vector signal indicating the amount of a vertical motion vector, said predetermined number is 2, and said distance based on said amount of the motion vector comprises a distance in a vertical direction corresponding to said amount of the vertical motion vector.

5. The method according to claim 1, wherein said chrominance signal comprises first and second color difference signals transmitted in a line sequential manner, said motion vector signal includes a vertical motion vector signal indicating the amount of a vertical motion vector, said predetermined number is 4, said distance based on said amount of the motion vector comprises a distance in a vertical direction corresponding to said amount of the vertical motion vector, and said chrominance signal in any of the previous frames is a chrominance signal one frame before.

6. An apparatus for motion vector compensation which carries out compensation for a chrominance signal included in a received television signal based on an MUSE system in response to a motion vector signal multiplexed on said television signal, comprising:

first determining means (112; 140; 169, 179; 33) for determining whether or not the remainder obtained by dividing the amount of a vector indicated by said motion vector signal by a predetermined number is 0, and second determining means (13, 15; 602, 603; 30, 31) for determining a chrominance signal to be inserted into a position to be interpolated in the present frame depending on whether or not said remainder is 0, said second determining means (13, 15; 602, 603; 30, 31) determining a chrominance signal in any of the previous frames in a position spaced apart from said position to be interpolated by a distance based on said amount of the motion vector as said chrominance signal to be inserted when said remainder is 0 while producing a chrominance signal using a chrominance signal in any of the previous frames in the periphery of the position spaced apart from said position to be interpolated by the distance based on said amount of the motion vector and determining said produced chrominance signal as said chrominance signal to be inserted when said remainder is not 0.

7. The apparatus for motion vector compensation according to claim 6, wherein said chrominance signal comprises a chrominance signal time-compressed at a predetermined compression rate, said motion vector signal includes a horizontal motion vector signal indicating the amount of a horizontal motion vector, said predetermined number is the reciprocal of said predetermined compression rate, and said distance based on said amount of the motion vector is a distance in a horizontal direction corresponding to a value obtained by multiplying said amount of the horizontal motion vector by said predetermined compression rate.

8. The apparatus for motion vector compensation according to claim 6, wherein said chrominance signal comprises first and second color difference signals transmitted in a line sequential manner, said motion vector signal includes a vertical motion vector signal indicating the amount of a vertical motion vector, said predetermined number is 2, and said distance based on said amount of the motion vector is a distance in a vertical direction corresponding to said amount of the motion vector.

9. The apparatus for motion vector compensation according to claim 6, wherein said chrominance signal comprises a chrominance signal time-compressed at a predetermined compression rate, said motion vector signal includes a horizontal motion vector signal indicating the amount of a horizontal motion vector, said predetermined number is a value obtained by multiplying the reciprocal of said predetermined compression rate by the number of frames required for one circulation of a sampling pattern, said distance based on said amount of the motion vector is a distance in a horizontal direction corresponding to a value obtained by multiplying said amount of the horizontal motion vector by said predetermined compression rate, and said chrominance signal in any of the previous frames is a chrominance signal one frame before.

10. The apparatus for motion vector compensation according to claim 6, wherein said chrominance signal comprises first and second color difference signals transmitted in a line sequential manner, said motion vector signal includes a vertical motion vector signal indicating the amount of a vertical motion vector, said predetermined number is 4, said distance based on said amount of the motion vector is a distance in a vertical direction corresponding to said amount of the motion vector, and said chrominance signal in any of the previous frames is a chrominance signal one frame before.

11. An apparatus for horizontal motion vector compensation which carries out compensation for a chrominance signal included in a received television signal based on an MUSE system and time-compressed at a predetermined compression rate in response to a horizontal motion vector multiplexed on said television signal, comprising:

horizontal motion vector detecting means (23) for detecting a horizontal motion vector signal indicating the amount of a horizontal motion vector from said television signal, interframe interpolating means (7) for carrying out interframe interpolation using a time compressed chrominance signal in the present frame and a time compressed chrominance signal in any of the previous frames, delay amount outputting means (26) responsive to an output of said horizontal motion vector detecting means (23) for outputting a value obtained by dividing said amount of the horizontal motion vector by the reciprocal of said compression predetermined rate as the amount of delay, delay providing means (13; 602) responsive to an output of said delay amount outputting means (26) for providing delay to said time compressed chrominance signal in any of the previous frames in said interframe interpolating means (7), and filter means (15; 603) for compensating for said time compressed chrominance signal in any of the previous frames in said interframe interpolating means (7) in accordance with predetermined processing corresponding to the remainder obtained by dividing said amount of the horizontal motion vector by the reciprocal of said predetermined compression rate when the remainder is not 0.

12. The apparatus for horizontal motion vector compensation according to claim 11, wherein said predetermined processing comprises one-dimensional or two-dimensional spacial filter processing for multiplying the time compressed chrominance signals in any of said previous frames delayed by said delay providing means (13, 602) by predetermined coefficients, respectively, and adding the results of multiplication to each other.

13. The apparatus for horizontal motion vector compensation according to claim 11, wherein said amount of delay in said delay amount providing means (13; 602) is determined in units of an interval of one-half of transmission sampling interval of said television signal.

14. The apparatus for horizontal motion vector compensation according to claim 11 wherein said filter means (15; 603) compensates for movement in a horizontal direction of an interval of one-half of transmission sampling interval or less with respect to said time compressed chrominance signal in any of the previous frames in said interframe interpolating means (7).

15. An apparatus for horizontal motion vector compensation which carries out compensation for a chrominance signal included in a received television signal based on an MUSE system and time-compressed at a predetermined compression rate in response to a horizontal motion vector multiplexed on said television signal, comprising:

horizontal motion vector detecting means (23) for detecting a horizontal motion vector signal indicating the amount of a horizontal motion vector from said television signal, interframe interpolating means (7) for carrying out interframe interpolation using a time compressed chrominance signal in the present frame and a time compressed chrominance signal in any of the previous frames, delay amount outputting means (26) responsive to an output of said horizontal motion vector detecting means (23) for outputting a value obtained by dividing said amount of the horizontal motion vector by the reciprocal of said predetermined compression rate as the amount of delay, delay providing means (13) responsive to an output of said delay amount outputting means (26) for providing delay to said time compressed chrominance signal in any of the previous frames in said interframe interpolating means (7), and filter means (15) for producing a time compressed chrominance signal to be inserted into a position to be interpolated in the present frame in said interframe interpolating means (7) in accordance with predetermined processing corresponding to the remainder obtained by dividing said amount of the horizontal motion vector by a value obtained by multiplying the reciprocal of said predetermined compression rate by the number of frames required for one circulation of a sampling pattern using a time compressed chrominance signal only one frame before out of time compressed chrominance signals in any of the previous frames when the remainder is not 0.

16. The apparatus for horizontal motion vector compensation according to claim 15, wherein said filter means (15) compensates for movement in a horizontal direction of an interval of transmission sampling interval or less with respect to said time compressed chrominance signal one frame before in said interframe interpolating means (7).

17. An apparatus for vertical motion vector compensation which carries out compensation for two types of color difference signals included in a received television signal based on an MUSE system and transmitted in a line sequential manner in response to vertical motion vector signal multiplexed on said television signal, comprising:

vertical motion vector detecting means (23) for detecting a vertical motion vector signal indicating the amount of a vertical motion vector from said television signal, interframe interpolating means (7; 30) for carrying out interframe interpolation using a color difference signal in the present frame and a color difference signal in any of the previous frames, delay amount outputting means (14) responsive to an output of said vertical motion vector detecting means (23) for outputting the amount of delay corresponding to said amount of the vertical vector, delay providing means (11) responsive to an output of said delay amount outputting means (14) for providing delay to said color difference signal in the previous frame in said interframe interpolating means (7; 30), and filter means (31) for producing a color difference signal to be inserted into a position to be interpolated in the present frame in said interframe interpolating means (7; 30) using a color difference signal in the previous frame in a position spaced apart from said position to be interpolated by a distance corresponding to said amount of the vertical motion vector or in the periphery thereof such that said color difference signal to be inserted becomes the same type of color difference signal as other color difference signals on a line to which the position to be interpolated belongs.

18. The apparatus for vertical motion vector compensation according to claim 17, wherein said filter means (31) comprises spacial filter means for performing one-dimensional or two-dimensional spacial filter processing in accordance with predetermined processing corresponding to each value of the amount of the vertical motion vector.

19. An apparatus for motion vector compensation which carries out compensation for two types of color difference signals included in a received television signal based on an MUSE system and time-compressed at a predetermined compression rate to be transmitted in a line sequential manner and a luminance signal, in response to horizontal and vertical motion vector as multiplexed on said television signal, comprising:

motion vector detecting means (23) for detecting a horizontal motion vector signal indicating the amount of the horizontal motion vector and a vertical motion vector signal indicating the amount of the vertical motion vector from said television signal, interframe interpolating means (7; 30) for carrying out interframe interpolation using a time compressed color difference signal or a luminance signal in the present frame and a time compressed color difference signal or a luminance signal in any of the previous frames, horizontal delay amount outputting means (26; 601) responsive to an output of said motion vector detecting means (23) for outputting as a first amount of delay a value obtained by multiplying said amount of the horizontal motion vector by said predetermined compression rate and outputting as a second amount of delay the amount of said horizontal motion vector, vertical delay amount outputting means (14) responsive to the output of said motion vector detecting means (23) for outputting a third amount of delay corresponding to said amount of the vertical motion vector, delay providing mans responsive to outputs of said horizontal and vertical delay amount outputting means (26, 601, 14) for providing delay to said time compressed color difference signal in any of previous frames in said interframe interpolating means (7; 30), first filter means (15) for producing a time compressed color difference signal to be inserted into a position to be interpolated in the present frame in said interframe interpolating means (7; 30) in accordance with predetermined processing corresponding to the remainder obtained by dividing said amount of the horizontal motion vector by a value obtained by multiplying the reciprocal of said predetermined compression rate by the number of frames required for one circulation of a sampling pattern using a time compressed color difference signal only one frame before out of time compressed color difference signals in any of the previous frames when the remainder is not 0, and second filter means (31) for producing a time compressed color difference signal to be inserted into a position to be interpolated in the present frame in said interframe interpolating means (7; 30) using a time compressed color difference signal only one frame before in a position spaced apart from said position to be interpolated by a distance corresponding to said amount of the vertical vector or in the periphery thereof such that said time compressed color difference signal to be inserted becomes the same type of time compressed color difference signal as other time compressed color difference signals on a line to which the position to be interpolated belongs.

* * * * *